July 14, 1942.    J. B. BRENNAN    2,289,339
METHOD FOR MAKING ELECTRIC DEVICES.
Filed Aug. 20, 1938    3 Sheets-Sheet 1
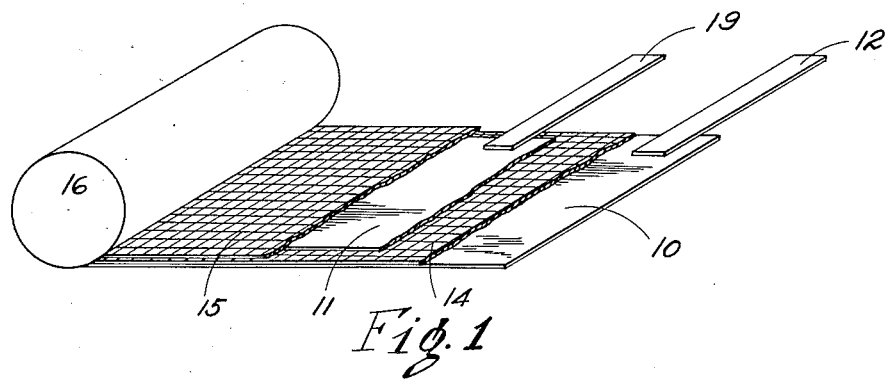
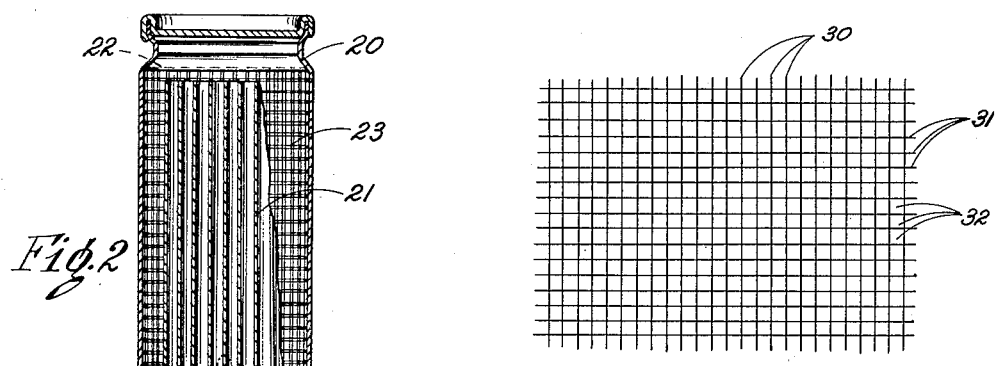
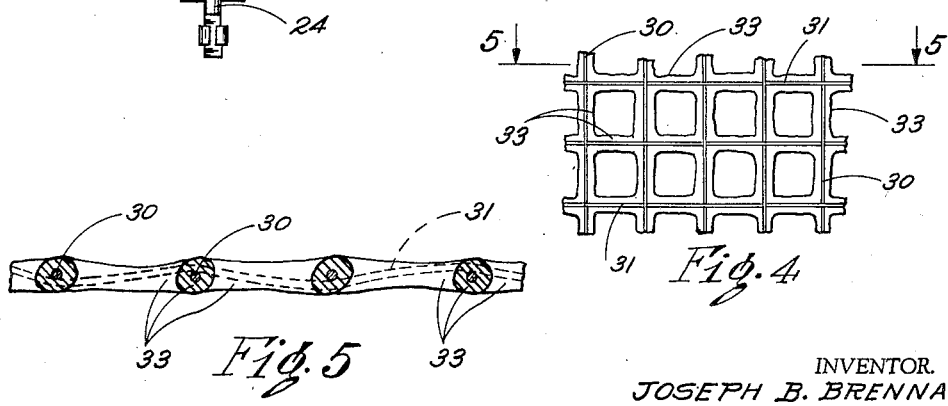
INVENTOR.
JOSEPH B. BRENNAN
BY
Richey & Watts
ATTORNEYS July 14, 1942.　　　J. B. BRENNAN　　　2,289,339

METHOD FOR MAKING ELECTRIC DEVICES

Filed Aug. 20, 1938　　　3 Sheets-Sheet 2

INVENTOR.
JOSEPH B. BRENNAN
BY
Richey & Watts
ATTORNEYS

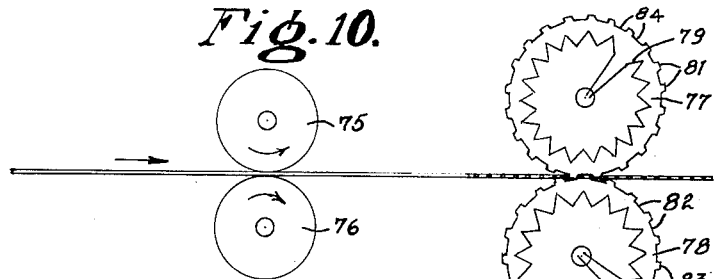
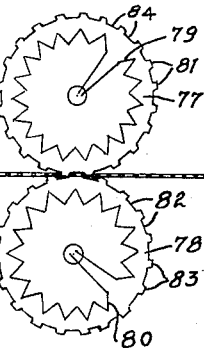
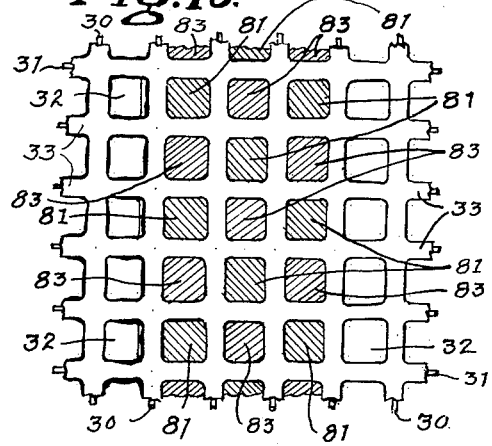
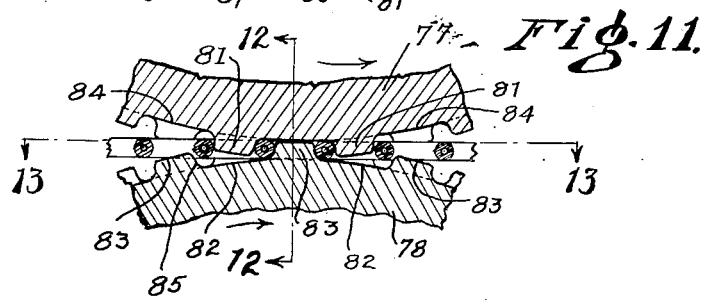
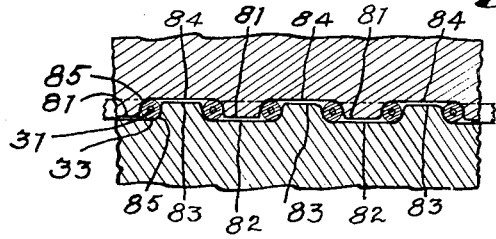
INVENTOR.
JOSEPH B. BRENNAN.

Patented July 14, 1942

2,289,339

UNITED STATES PATENT OFFICE 2,289,339

METHOD FOR MAKING ELECTRIC DEVICES

Joseph B. Brennan, Euclid, Ohio

Application August 20, 1938, Serial No. 225,941

3 Claims. (Cl. 18—56)

This invention relates to a method of making spacers for electrolytic condensers and similar devices, and this application is a continuation in part of my copending application Serial No. 36,182, filed August 14, 1935.

In electrolytic condensers of the paste type wherein the electrodes comprise thin sheets of aluminum or other suitable material rolled into cylindrical form, as well as in electrolytic condensers of the liquid type, it is essential to prevent actual contact between the electrodes and at the same time to arrange the electrodes close together to reduce the resistance of the electrolyte and to make the condenser compact. Thus a separator of sufficient strength, stiffness and thickness to prevent contact between the electrodes is required, and at the same time the separator must not be damaged by the ordinary heat of operation of the condenser and must be of such character that it will not increase the resistance of the condenser to any material extent, and will not contaminate the electrolyte, or have any other damaging effect on the condenser.

It is among the objects of my invention to provide an efficient and economical method of making spacers having the desirable characteristics noted above. Further objects and advantages of my invention will become apparent from the following description of preferred forms thereof. The essential characteristics are summarized in the claims.

Figure 6:
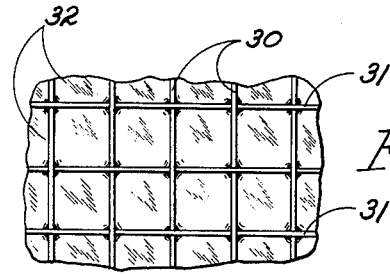
Figure 7:
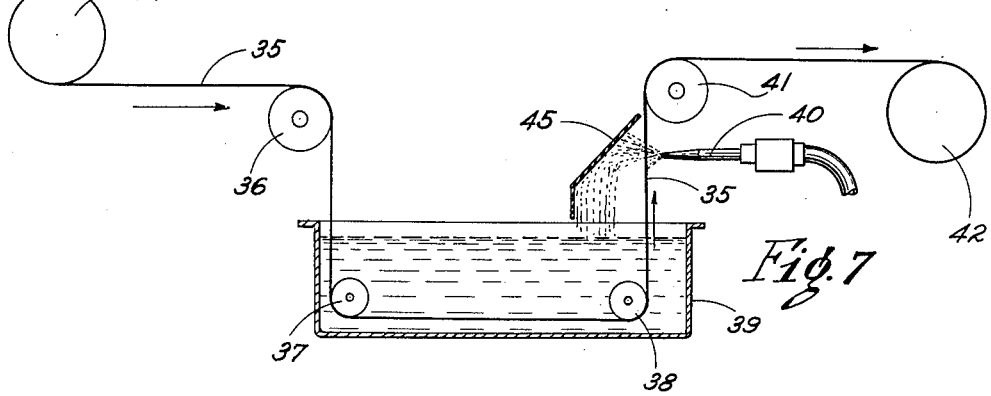
Figure 8:
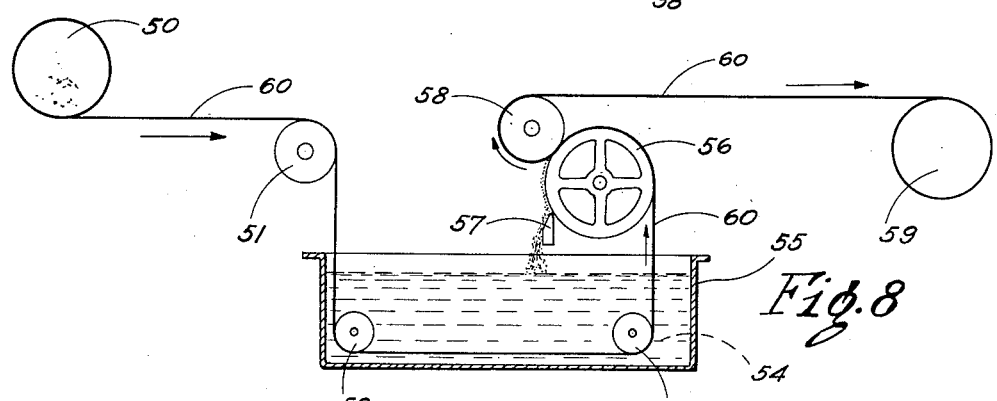
Figure 9:
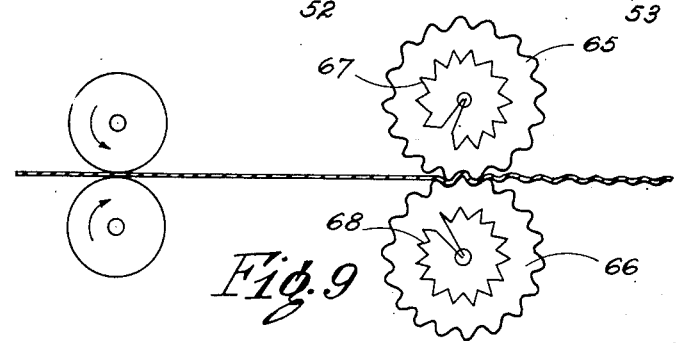

In the drawings Figure 1 illustrates a paste type condenser made according to my invention, the condenser being partially unrolled to illustrate the internal construction thereof. Figure 2 is a cross-sectional view of a liquid type of condenser embodying a spacer made according to my invention. Figure 3 is a plan view of a preferred form of spacer material. Figure 4 is a view similar to Figure 3 but on a large scale. Figure 5 is a section taken along the line 5—5 of Figure 4. Figure 6 is a plan view of my spacer during an intermediate stage in the manufacture thereof, and Figure 7 is a diagrammatic illustration of apparatus which may conveniently be employed for producing my spacers. Figure 8 illustrates an alternative form of apparatus for producting the spacer material. Figure 9 illustrates a corrugating mechanism which may be incorporated in the devices shown in Figures 7 and 8. Figure 10 is a diagrammatic illustration of an apparatus which may be employed for pressing the treated fabric. Figure 11 is a sectional view on an enlarged scale of the pressing rolls shown in Figure 10. Figure 12 is a sectional view as indicated by the line 12—12 on Figure 11. Figure 13 is a sectional view taken at right angles to Figure 12 as indicated by line 13—13 on Figure 11.

Briefly a spacer made according to my invention preferably comprises a thin sheet of reticulated fibrous material such as fabric netting or perforated paper in which the individual strands or threads forming the sheet or the paper defining the perforations are coated or encased in a layer of material which is impervious to the electrolyte and which is not affected by the electrolyte or by the heat which may be developed in the condenser in use. I have found cotton fabric netting of 10 to 40 mesh to be suited for my purpose, and preferably I coat the threads making up the netting with material such as rubber latex, nitrocellulose lacquers, lacquer emulsions or various condensation products.

In order rapidly and conveniently to coat the material I have found it advantageous to pass a web of the material continuously through a tank containing the coating solution. The reticular material ordinarily retains a film of the coating material in the open spaces therein, and in order to remove the film or "windows" thus formed and produce an open network, I preferably blow the excess material out of the open spaces with a blast of compressed air or other suitable gas. The material with the coating remaining thereon after the blowing operation is then allowed to dry after which it can conveniently be assembled in condensers. Prior to assembly the material may be subjected to heat and pressure treatment as required by the particular fabric coating substance. In some types of condensers I have found it advantageous to run the material through hot corrugating rolls to give the spacer greater effective thickness.

Referring now to the drawings in Figure 1, I have illustrated a paste type condenser. This condenser is of a well known type and may comprise two aluminum plates 10 and 11, one or both of which may be provided with dielectric films depending upon the service for which the condenser is intended. The plates are provided with terminals 12 and 19, respectively, and are spaced apart by separators 14 and 15. The electrolyte comprises a paste which is spread on the surfaces of the plates and fills the interstices of the separators 14 and 15. The paste may preferably be made according to United States Patent No. 2,095,966 or 2,104,733, although any other suitable electrolytic pastes may be employed if desired. After the electrode plates, separators, terminals and paste are assembled together the whole may be rolled into cylindrical form as illustrated at 16, In Figure 2 of the drawings I have illustrated the application of my separator to a liquid type of condenser which may comprise a container 20 which also forms the cathode of the condenser, an anode 21 within the container 20 and immersed in the electrolyte 22, and a separator 23 to prevent the anode from touching the cathode. The anode may be supported by a riser 24 extending through a neck 25 formed integrally with the container 20, the neck being compressed inwardly against a rubber gasket or sleeve 28 to form a seal between the riser and the neck.

In either case, my separator preferably comprises the netting illustrated in Figures 3, 4, and 5 of the drawings, and consisting of interwoven strands or threads 30 and 31 woven to leave spaces indicated at 32. I have found that cotton fabric netting of about ten to forty open spaces per inch provides a low cost and efficient base material for the spacer. The netting selected should be free from impurities such as chlorides and sulphates which would adversely effect the electrolyte. It will be noted that the area of the spaces 32 is great as compared to the area of the strands 30 and 31, and thus the spacer will not materially increase the resistance of the condensers.

In order to strengthen or stiffen the material of the spacer and also to gain a slight additional thickness in the spacer, the individual threads or strands 30 and 31 thereof are encased in a material which is impervious to the electrolyte, and which will not contaminate the electrolyte nor be affected by the heat generated in a condenser. The completed construction is illustrated on a greatly enlarged scale in Figures 4 and 5, wherein it will be seen that each of the strands 30 and 31 is encased by a layer 33 of protective material. Preferably the material comprises a nitrocellulose lacquer, a lacquer emulsion, or rubber latex, although various other suitable inert materials may be employed such as resin varnishes of the phenol formaldehyde or urea formaldehyde type. The coating material selected should preferably be free from soluble chlorides or sulphates or other free impurities.

It will be seen that by so encasing the individual strands in an impervious material, the coated material becomes relatively rigid which adds to its strength and facilitates handling throughout the steps of manufacture such as cutting and rolling. Furthermore, it is not necessary that the coating permeate the material of the strands so long as the strands are completely encased in an impervious covering. By reason of this fact the coating can be carried out at high speed, as it is not necessary to allow sufficient time for the strands individually to become impregnated with the coating material.

Thus the coating operation can be carried out rapidly and expeditiously with the apparatus illustrated diagrammatically in Figure 7, which may comprise a roll 34 of untreated netting 35 mounted on a suitable support, the netting being guided by rollers 36, 37 and 38 through a bath of the coating material contained in a tank 39. As the netting emerges from the tank the coating material ordinarily forms a film or "window" in many if not all of the interstices 32 of the netting, thus producing the appearance diagrammatically illustrated in Figures 6, wherein the shading shows a thin film of coating material carried in the interstices 32. To remove the film and break the "windows" formed thereby the coated material 35 may be passed in front of a jet or nozzle 40 through which a blast of compressed air is discharged, although suction may be employed if desired. The air blows the excess material against a baffle or plate 45 arranged to conduct liquid back into the tank 39. This leaves each strand or thread of the netting in the web with a fairly uniform protective coating. Thereafter the web is passed over the pulley 41 and is allowed to travel along in the air for a sufficient distance for it to dry, and then it is coiled on the reel 42.

An alternative form of producing the spacer material is shown in Figure 8 wherein a storage roll 50 is arranged to feed material over guiding rolls 51—52—53 through the tank 55 containing the coating liquid 54. The web fabric 60 is conducted over a drum or roll 56 having a smooth outer surface. The film of coating liquid forming the windows tends to stick to the surface of the drum and thus is broken as the fabric is pulled from the drum by the guiding roll 58. A wiper blade or brush 57 is arranged to remove the liquid from the surface of the drum and conduct it back to the tank 55.

It will be understood that the spacer fabric made according to my invention is well suited to corrugating in order to increase the effective thickness thereof and may be passed through corrugating rolls 65 and 66 as shown in Figure 9. The rolls are preferably heated slightly to facilitate the corrugating process and electric heating means are indicated diagrammatically at 67 and 68.

In Figs. 10 to 13 I have illustrated apparatus whereby the impregnated netting may be subjected to heat and pressure to accurately size the openings and the coatings of the threads and if desired to cure or vulcanize the coating material. This apparatus may comprise a pair of feed rolls 75 and 76 adapted to deliver a web of material from a coating device such as those illustrated in Figs. 7 and 8, to a pair of pressure rolls 77 and 78 which if desired may be provided with electric or other heating elements 79 and 80, respectively.

As shown particularly in Figs. 11, 12 and 13 these rolls 77 and 78 are provided with interfitting projections which are designed to enter the openings 32 of the mesh fabric and to subject the coating 33 surrounding the strands 30 and 31 to a pressing and forming action. To accomplish this result, each roll is provided with alternate projections and depressions, the depressions being adapted to receive the projections of the mating roll when the rolls are operated together, and the projections and depressions being alternated in both circumferential and axial directions. Thus the projections 81 of the roll 77 enter the recesses or depressed portions 82 of the roll 78 while the projections 83 of the roll 78 enter the recesses 84 of the roll 77.

The recesses in each case are larger than the projections permitting both the transverse and the longitudinal strands to pass between the mating rolls. Preferably the bases of the projections are curved as indicated at 85 so that the mating wheels press the coating material 33 of the strands into substantially cylindrical form as shown. The coating material is ordinarily uneven immediately after the dipping operation has been completed as indicated on the left hand side of Fig. 13. However, after the web has been passed between the rolls 77 and 78 the coating material is pressed into a smooth and regular configuration as indicated on the right hand side of Fig. 13. By this method and apparatus the thickness of the coating on the strands and the size of the openings through the fabric can be accurately controlled. Further, the pressing step is of particular value in connection with those impregnating materials which require curing under heat and pressure. If desired, the material may be corrugated as shown in Figure 9, after passing between the rolls 77 and 78.

It will be noted that the coating materials which I employ, that is lacquer, lacquer emulsions, rubber latex or other rubber solutions or various resin varnishes, may be applied cold, and when once hardened will not be materially softened by the heat of operation developed in the condenser.

From the foregoing description of the preferred form of my invention, it will be seen that I have provided a method of making spacers for electrolytic condensers which can be carried out rapidly and economically by simple and inexpensive apparatus. Spacers made according to my method are substantially unaffected by the heat of operation or by the ingredients of the electrolyte and effectively separate the electrodes of condensers to which they are applied, and at the same time do not materially increase the resistance of the condensers in which they are incorporated. Thus condensers made according to my invention operate efficiently, are rugged and sturdy, and have long life and high breakdown voltage characteristics.

Various modifications and changes within the scope and spirit of my invention will be apparent to those skilled in the art. For example, different materials may be employed as the base of the netting to which the coating is applied, different coating materials may be used, or the order of the various steps of the method may be varied. Therefore, it is to be understood that my invention is not limited to the preferred form described herein, or in any manner other than by the scope of the appended claims when given the range of equivalents to which my patent may be entitled.

I claim:

1. That method of making a spacer for electrolytic condensers which comprises running a mesh fabric through a coating solution, passing the coated fabric over the periphery of a drum to remove the film of coating material from the openings in the mesh and thereafter subjecting the coating material remaining on the fabric to a pressing and shaping operation.

2. The method of making a spacer for electrolytic devices, which comprises passing a length of mesh fabric stock through a solution of insulating material, running the mesh fabric over the periphery of a drum to remove the film of insulating material from the openings in the mesh fabric and thereafter passing the fabric between a pair of rolls having complementary interfitting projections and depressions on their peripheral surfaces, which projections are adapted to enter the openings in said fabric to compress the individual coated threads of the mesh fabric.

3. The method of making a spacer for electrolytic devices, which comprises passing a length of mesh fabric stock through a solution of insulating material and thereafter passing the fabric between a pair of rolls having complementary interfitting projections and depressions on their peripheral surfaces, which projections are adapted to enter the openings in said fabric to compress the individual coated threads of the mesh fabric.

JOSEPH B. BRENNAN.